Dec. 15, 1959  I. L. FOWLER ET AL  2,917,647
GEIGER-MULLER TYPE COUNTER TUBE

Filed Aug. 1, 1955  2 Sheets-Sheet 1

INVENTORS
IVAN L. FOWLER
LYNN A. K. WATT

By— Smart & Bigger
ATTORNEYS.

Dec. 15, 1959    I. L. FOWLER ET AL    2,917,647
GEIGER-MULLER TYPE COUNTER TUBE
Filed Aug. 1, 1955    2 Sheets-Sheet 2
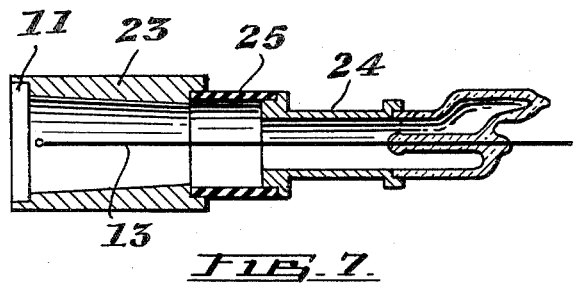
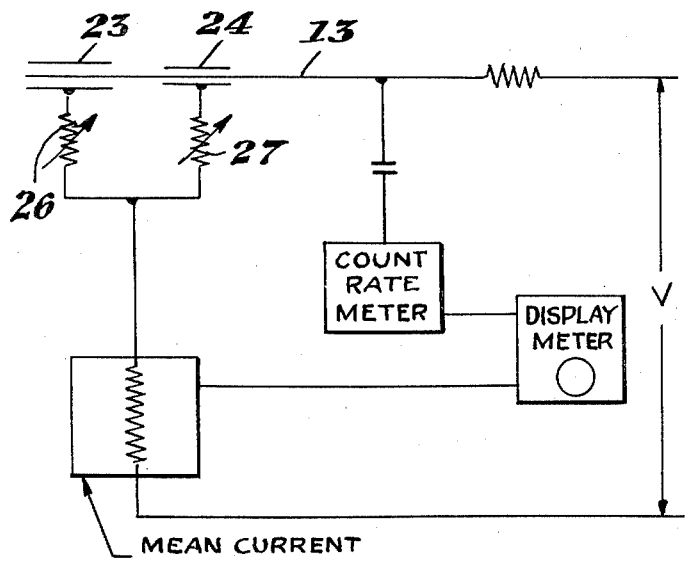
INVENTORS
IVAN L. FOWLER
LYNN A. K. WATT
By: Smart + Bigger
ATTORNEYS.

United States Patent Office 2,917,647
Patented Dec. 15, 1959

2,917,647

GEIGER-MULLER TYPE COUNTER TUBE

Ivan Landen Fowler and Lynn Alexander Keeling-Watt, Deep River, Ontario, Canada, assignors, by mesne assignments, to the United States of America as represented by the United States Atomic Energy Commission Application August 1, 1955, Serial No. 525,723

8 Claims. (Cl. 313—93)

The invention relates to Geiger-Muller type counter tubes for measuring beta and/or gamma radioactivity.

Beta and/or gamma radioactivity over a wide range of intensities can at present be measured by a scintillation counter, an ionization chamber, a proportional counter, or more than one conventional halogen-quenched Geiger-Muller counter operated in parallel, all with associated electronic circuits. Scintillation counters, ionization chambers and proportional counters are satisfactory but with associated circuitry are expensive if large numbers of installation are required. Operation of conventional halogen-quenched Geiger-Muller counters in parallel is satisfactory but difficulty may be encountered because the counters may not remain matched after initial adjustments. False readings result if the characteristics of one counter change or a counter becomes inoperative. However, the use of conventional halogen-quenched counters in parallel is attractive particularly for portable applications because the operating voltage may be kept relatively low and the associated circuitry is considerably less complicated and expensive than for the other types of chamber or counter mentioned above.

Halogen-quenched counters have the advantage over conventional organic quenched counters that their life is unaffected by counting; also, the operating voltage may be made much lower and the quenching agent is not used up during counting. At low counting rates individual pulses can be counted and integrated by a counting rate circuit for display on a meter. At high counting rates (for example, above 60,000 per minute) the mean current passed by the tube becomes appreciable and as the radiation intensity is further increased the mean current becomes a measure of the intensity of the radiation. Over an intensity range of at least 50 to 1 the mean current varies as the logarithm of the radiation intensity and at very high radiation intensity the mean current levels off to a saturation value. However, to obtain a high enough mean current to operate a practical meter (say 50 microamperes) the physical size of the counter must be kept small. A counter of conventional cylindrical geometry and of conventional shape (i.e., sensitive length at least twice the cathode diameter) which is large enough to be sensitive at low radiation intensities, has a low saturation current and saturation occurs in a radiation field of medium intensity. As the size of the counter is reduced the saturation current increases and also the radiation field which produces saturation. For example a counter ¾" diameter 1½" long had a saturation current of only a few microamperes and saturation occurred in a radiation field of about 1 r. per hour. Another counter ¼" diameter and 1" long had a saturation current of 20 microamperes with twice the load resistance used on the first counter and saturation occurred in a radiation field of about 10 r. per hour. A third counter ¹⁄₁₆" diameter and ⅝" long had a saturation current of 50 microamperes with a higher load resistance than that used with the second counter and saturation occurred at about 500 r. per hour. Hence it is necessary in present equipments to use two or more counters of different sizes in parallel with matching circuitry to cover a wide range of radiation intensities.

The object of the present invention is to provide a counter which retains the advantages of operating more than one conventional Geiger-Müller counter in parallel while overcoming the disadvantages which arise from combining the characteristics of more than one counter operated in parallel. A further object is to provide, in counters which are required to be sensitive to both beta and gamma radiation, a means whereby the ratio of sensitivity to beta and gamma radiation may be varied over a wide range.

The present invention provides a single counter which is as effective as using two or more of the previous known counters in parallel and, also, a counter in which the beta and gamma sensitivity may be varied. A counter tube according to the present invention comprises a tubular cathode and an anode extending centrally of the cathode with the spacing between the outer surface of the anode and the inner surface of the cathode having substantial variations along the length of the anode. The arrangement according to the invention of varying the anode to cathode spacing along the length of the counter tube maintains a large counting volume in one portion, thereby providing adequate sensitivity for measuring low radiation intensities, and at the same time provides a portion, or portions, of smaller volume with close electrode spacing thereby making possible high mean current for the measurement of intense radiation fields. This same arrangement provides a means of obtaining a large increase in beta sensitivity without substantially changing the gamma sensitivity.

The cathode of a counter tube according to the invention may form a part of the gas-tight envelope of the tube and, if beta sensitivity is required, the cathode may be fitted with an end-window. Preferably the counter tube is halogen quenched but other suitable quenching agents may be used.

The invention will be further described with reference to the accompanying drawings in which:

Figure 7 shows a modification of a counter tube according to the invention in which sections of the cathode are electrically insulated from each other; and Figure 8 is a schematic circuit diagram showing circuit connections to the counter tube shown in Figure 7.

Figure 2:
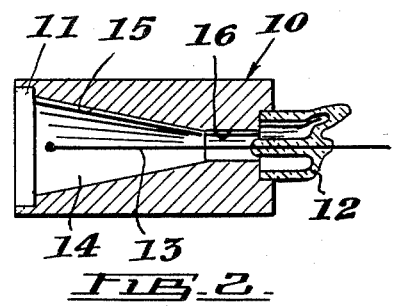

Each of the counter tubes shown in each of Figures 1 to 6 comprises a gas-tight tubular cathode 10 fitted with a conventional end-window 11 and a conventional insulator seal 12 through which passes the anode 13. It is a common characteristic of the counter tubes shown in these figures that the spacing 14 between the outer surface of the anode 13 and the inner surface of the cathode 10 has substantial variations along the length of the anode 13. In the counter tube shown in Figure 1 this is achieved by forming the cathode 10 so that its inner surface is conically shaped. In Figure 2 the portion 15 of the inner surface of the cathode 10 next to the end-window 11 is conical shaped with the portion 16 next the insulator seal 12 is cylindrically shaped. The counter tube shown in Figure 3 has a cathode 10 of which the inner surface forms two cylindrical surfaces 17 and 18 of different diameters, the larger diameter cylindrical surface 17 being next to the end-window 11. If desired the outer surface of the cathode 10 may also be shaped similarly to that of the inner surface to produce a uniform wall thickness. In this case the cathode 10 may be formed by pressing from sheet metal.

Figure 1:
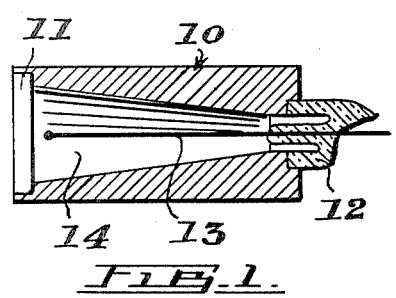
Figures 1, 2 and 3 show diagrammatically counter tube structures in accordance with the invention in which the inner surface of the cathode is shaped to provide varying spacing between the cathode and the anode.
Figure 4:
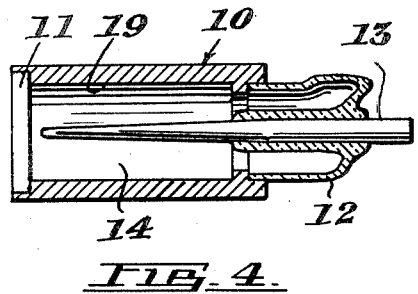
Figures 4, 5 and 6 show diagrammatically structures of counter tubes in accordance with the invention in which the outer surface of the anode is shaped so as to provide varying spacings between the anode and the cathode.
Figure 5:
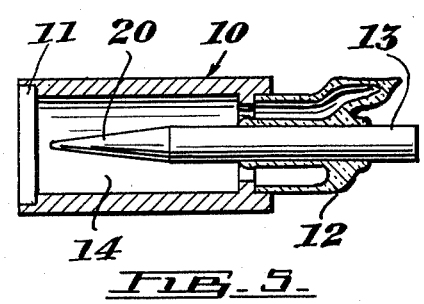
Figure 3:
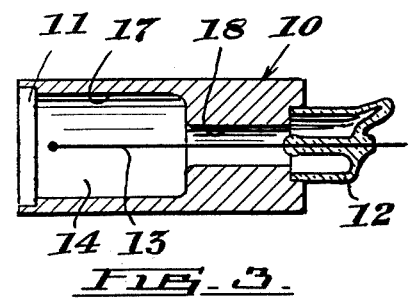
Figure 6:
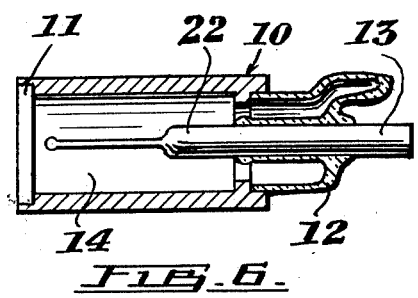

In the case of the counter tubes shown in Figures 4, 5 and 6, the inner surface 19 of the cathode 10 is cylindrically shaped while the outer surface of the anode 13 is shaped so that the spacing 14 between the outer surface of the anode 13 and the inner surface of the cathode 10 is substantially greater near the end-window 11 than near the insulator seal 12. In Figure 4 this is achieved by having the outer surface of the anode 13 conically shaped. In Figure 5 the portion 20 of the anode 13 next the end-window 11 is conically shaped while the remainder of the anode 13 is cylindrically shaped. The counter tube shown in Figure 6 has an anode with two cylindrical surfaces 21 and 22 of different diameters, the cylindrical surface 21 having the smaller diameter being next the end-window 11.

Figure 7 shows a modification of a counter tube according to the invention in which sections 23 and 24 of the cathode are electrically insulated from each other by an insulator 25 to allow trimmer resistors 26 and 27 (Figure 8) to be included in the separate cathode section circuits thereby providing fine adjustment of the overall characteristics of the counter tube and its associated circuit.

Construction of counter tubes in accordance with the invention can be carried out by conventional techniques. For gamma radiation the beta window is not required and may be omitted. However, this window may be retained and used for calibrating the instrument by using a built-in beta source which is shielded with a shutter in normal use for gamma measurements. The size of the counter will be determined in accordance with usual design procedure for the application for which the counter is intended. The following is an example of the size of a counter according to the invention for a particular application:

Over-all sensitive length of 1¾ inches tapering from ⅞ inch diameter at the end-window to ⅜ inch diameter over a length of about 1¼ inches, followed by a cylindrical section ⅜ inch diameter and ½ inch long. This counter has a cylindrical anode .020 inch in diameter and is operated at 480±20 volts.

What we claim as our invention is:

1. A Geiger-Müller type halogen-quenched end-window counter tube comprising a tubular cathode having an inner surface of circular cross section, an anode extending substanitally coaxially with the cathode, an end-window fitted to one end of the cathode, the spacing between the outer surface of the anode and the inner surface of the cathode being substantially greater near the end of the cathode fitted with the said end-window than near the other end of the cathode, said spacing providing a large counting volume adjacent the end window for measuring low radiation intensities and a small counting volume remote from said end window for measurement of high intensity radiation, means applying an operating potential between the cathode and anode along the full length of the cathode.

2. A counter as defined in claim 1 in which the inner surface of the cathode is conically shaped.

3. A counter as defined in claim 1 in which the inner surface of the cathode is conically shaped near the end-window, the remainder of the said inner surface being cylindrically shaped.

4. A counter as defined in claim 1 in which the inner surface of the cathode forms at least two cylindrical surfaces of different diameters, the cylindrical surface of greater diameter being next to the end-window.

5. A counter as defined in claim 1 in which the outer surface of the anode is conically shaped.

6. A counter as defined in claim 1 in which the outer surface of the anode is conically shaped near the end-window, the remainder of said outer surface being cylindrically shaped.

7. A counter as defined in claim 1 in which the outer surface of the anode forms at least two cylindrical surfaces of different diameters, the cylindrical surface of lesser diameter being next the end-window.

8. A counter as defined in claim 1 in which the cathode comprises at least two sections of different sizes electrically insulated from each other.

References Cited in the file of this patent

UNITED STATES PATENTS

| | | |
|---|---|---|
| 1,059,095 | Whitehead | Apr. 5, 1912 |
| 2,411,241 | Arnott et al. | Nov. 19, 1946 |
| 2,471,263 | Depew | May 24, 1949 |
| 2,489,627 | Dudley | Nov. 29, 1949 |
| 2,542,440 | Victoreen et al. | Feb. 20, 1951 |
| 2,574,000 | Victoreen | Nov. 6, 1951 |
| 2,657,315 | Goldstein | Oct. 27, 1953 |
| 2,691,741 | Swift | Oct. 12, 1954 |
| 2,728,861 | Glass | Dec. 27, 1955 |
| 2,835,839 | Borzin | Nov. 20, 1958 |

OTHER REFERENCES

"Experiments on the Theory of the Action of the Geiger Point Counter," by Joseph Morgan et al., Journal of the Franklin Institute, vols. 237, 238, pages 371–384, 1944.

"Self-Quenching Halogen-Filled Counters," by Liebson et al., The Review of Scientific Instruments, vol. 19, No. 5, May 1948, pages 303–306.

"Theory and Operations of Geiger-Müller Counters, II," by Sanborn C. Brown, Nucleonics, August 1948, pages 50–64.